UNITED STATES PATENT OFFICE.

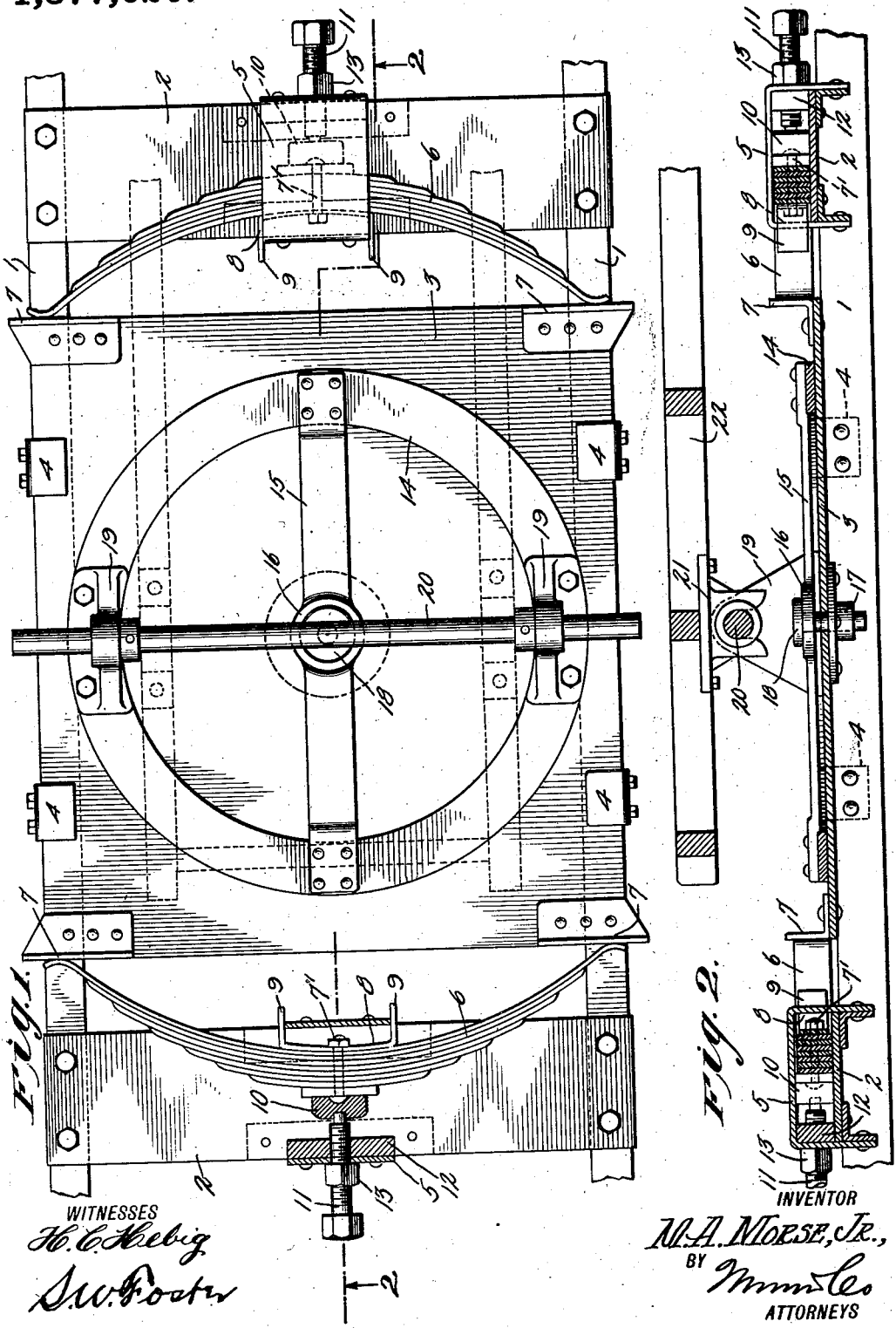

MARK ALFRED MORSE, JR., OF NEW ORLEANS, LOUISIANA, ASSIGNOR TO WILLIAM H. WARD, OF NEW ORLEANS, LOUISIANA.

FIFTH-WHEEL.

1,377,020.      Specification of Letters Patent.      Patented May 3, 1921.

Application filed May 5, 1920. Serial No. 379,090.

*To all whom it may concern:*

Be it known that I, MARK A. MORSE, Jr., a citizen of the United States, and a resident of the city of New Orleans, in the parish of Orleans and State of Louisiana, have invented a new and Improved Fifth-Wheel, of which the following is a full, clear, and exact description.

This invention relates to improvements in fifth wheels, an object of the invention being to provide a fifth wheel supported on an elastically cushioned vibrating plate, and having a rocker shaft thereon providing pivotal mounting for a trailer section so that all thrusts, shocks and jars are absorbed regardless of the angular disposition of the trailer section.

A further object is to provide a device of the character stated, which cushions the draft strains and which permits a perfect operation of the device in all positions of the parts regardless of the condition of the road or the angle of the turn.

With these and other objects in view, the invention consists in certain novel features of construction and combinations and arrangements of parts as will be more fully hereinafter described and pointed out in the claims.

In the accompanying drawings:

Figure 1 is a sectional plan view with the trailer section removed.

Fig. 2 is a view in longitudinal section on the line 2—2 of Fig. 1 with the trailer section in place.

1, 1, represent the parallel channel bars of the chassis frame having spring bearing plates 2, 2, bolted thereto and spaced apart.

A sliding or vibrating plate 3 is mounted on the bars 1, 1, between the plates 2 and is held against lateral displacement by means of angle brackets 4 secured to the bars 1 and projecting over the side edges of the plate 3.

Each plate 2 supports at its center a spring box 5 through which a spring 6 projects and has its ends bearing against angle plates 7 on the end of the plate 3. These springs 6 hold the plate 3 in normal position and cushion all longitudinal strains and stresses thereon.

Each spring is secured, in a U-shaped spring bolt 7' which also confines a spring safety clip 8 the latter having its ends 9 projecting beyond the side edges of the spring box 5 and holding the spring against lateral movement.

Gibs 10 are located against the outer ends of the spring bolts 7 and cupped to receive the ends of adjusting bolts 11, the latter having screw-threaded engagement with blocks 12 fixed in the boxes 5 and operating to adjust the pressure of the springs against the vibrating plate 3. Jam nuts 13 are provided on the bolts 11 to lock them in any position of adjustment.

14 represents a fifth wheel which rests upon the plate 3 and has a cross bar 15 provided with a central bearing 16 registering with the bearing 17 on the plate 3 for the reception of the king pin 18.

Bearing brackets 19 are secured on the fifth wheel 14 and support a rock shaft 20 on which latter bearing brackets 21 fixed to the under face of the trailer frame or section 22 are positioned.

In operation the trailer frame 22 is free to pivot on the rock shaft 20 and all longitudinal strains cause a movement of the vibrating plate longitudinally of the chassis which movement is cushioned and checked by the springs 6 regardless of the incline or angle of the trailer section 22.

The major claim I make for this fifth wheel is the flexibility as imparted by the vibrating or sliding plate and springs. Pulls and strains are carried toward the springs, which absorb all thrusts. The rocking motion is effective at all angles occupied by the vehicle.

It will be noted that the device differs from other like devices in having but one circle, said circle operating upon the large vibrating plate, rendering impossible overlapping of wheel circles as where two circles are used in the ordinary fifth wheels when subjected to heavy strains due to undulations of the road. The vibrating plate is moved to and fro during the entire time, during hauls. The rocking device is so arranged that there is never a parting of circle wheel and vibrating plate when making turns on heavy or uneven roads.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:

1. The combination with chassis bars, of a vibrating plate mounted on said bars, spring supporting plates secured to said bars, springs having their intermediate portions adjustably secured to the spring supporting plates and their ends engaging the vibrating plate, and a fifth wheel on said vibrating plate.

2. The combination with chassis bars, of a vibrating plate mounted on said bars, spring supporting plates secured to said bars, springs having their intermediate portions adjustably secured to the spring supporting plates and their ends engaging the vibrating plate, a fifth wheel on said vibrating plate, a rock shaft on the fifth wheel, and a trailer frame pivotally supported on said shaft.

3. The combination with chassis bars, of a vibrating plate on said bars, a fifth wheel on the plate, bearing brackets on the fifth wheel, a rock shaft in said bearing brackets, a trailer frame, bearing brackets on said frame mounted on the shaft and springs engaging the ends of the vibrating plate and cushioning the movement thereof.

4. The combination with chassis bars, of a vibrating plate on said bars, a fifth wheel on the plate, bearing brackets on the fifth wheel, a rock shaft in said bearing brackets, a trailer frame, bearing brackets on said frame mounted on the shaft, spring supporting plates secured to the chassis bars, boxes on said last mentioned plates, springs in said boxes having their ends engaging the vibrating plate and bolts in the boxes for adjusting the tension of the springs.

5. The combination with chassis bars, of a vibrating plate on said bars, a fifth wheel on the plate, bearing brackets on the fifth wheel, a rock shaft in said bearing brackets, a trailer frame, bearing brackets on said frame mounted on the shaft, spring supporting plates secured to the chassis bars, boxes on said last mentioned plates, springs in said boxes having their ends engaging the vibrating plate, bolts in the boxes for adjusting the tension of the springs, clips secured to the springs and engaging the sides of the boxes guiding the movement of the springs, and angle brackets on the bars overlapping the side edges of the vibrating plate.

MARK ALFRED MORSE, Jr.